Nov. 23, 1937.  V. L. TUNAYA  2,100,043
RIOT CAR
Filed Feb. 18, 1936  3 Sheets-Sheet 3

Inventor
V. L. Tunaya

By Clarence A. O'Brien and
Hyman Berman
Attorneys

Patented Nov. 23, 1937

2,100,043

UNITED STATES PATENT OFFICE 2,100,043

RIOT CAR

Victorino L. Tunaya, Brooklyn, N. Y.

Application February 18, 1936, Serial No. 64,546

1 Claim. (Cl. 89—36)

This invention appertains to new and useful improvements in armored vehicles and more particularly to a vehicle especially adapted for confronting rioters.

The principal object of the present invention is to provide a vehicle of the character stated wherein water discharge nozzles are provided to permit a strong stream to be played on a rioting group of persons, or in the event of a serious disturbance, the vehicle is provided with machine gun mounts.

An important object of the present invention is to provide a riot car construction in such a manner as to substantially protect the occupants thereof and to deal with rioters in accordance with their propensities.

Other important objects and advantages of the invention will become apparent to the reader of the following specification.

In the drawings:

Figure 4 is a diagrammatic view showing the filler means of the tank.

Figure 5 is a diagrammatic view showing the discharge means from the tank to the nozzles.

Figure 1:
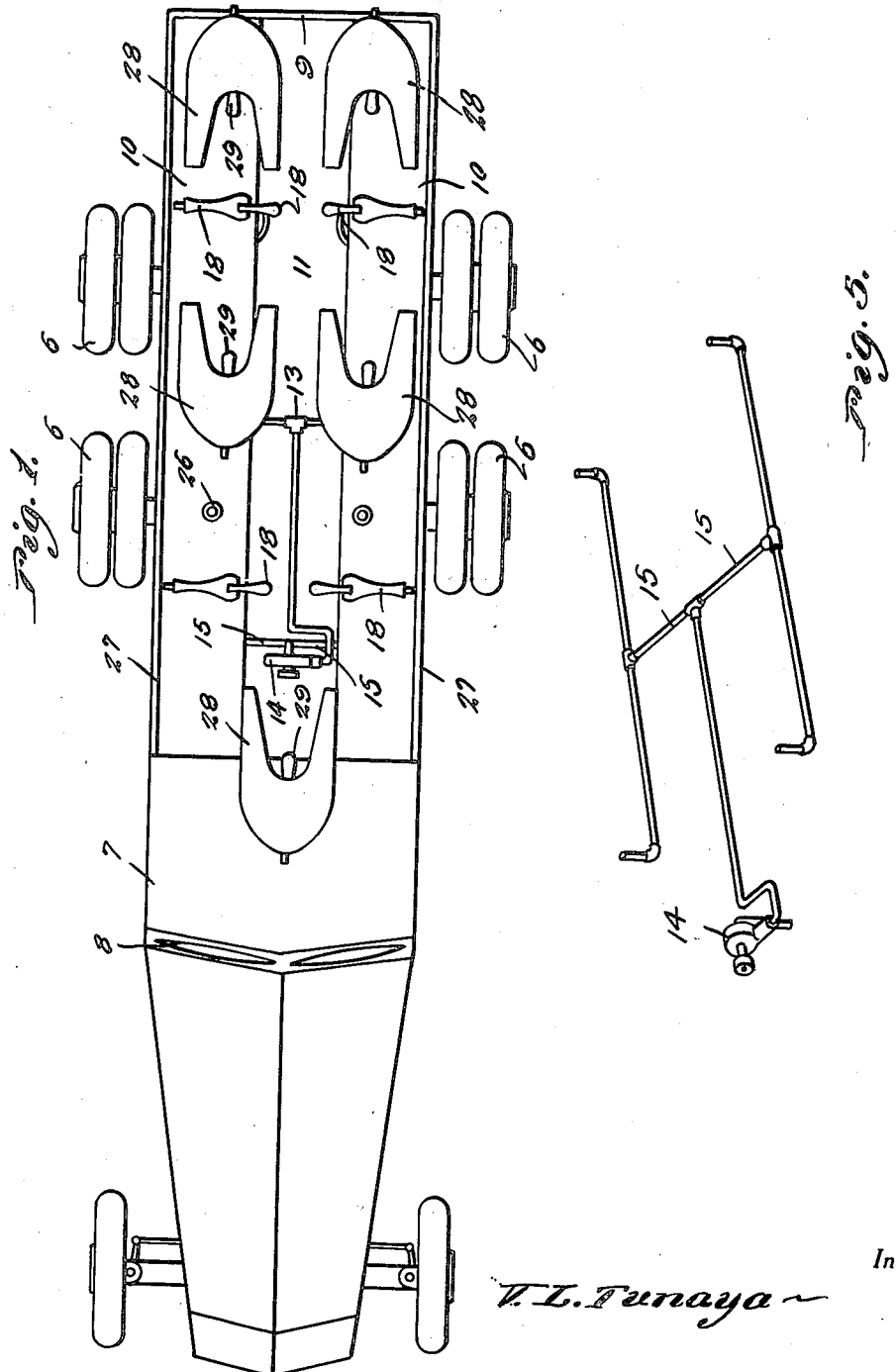
Figure 1 represents a top plan view of the vehicle.
Figure 2:
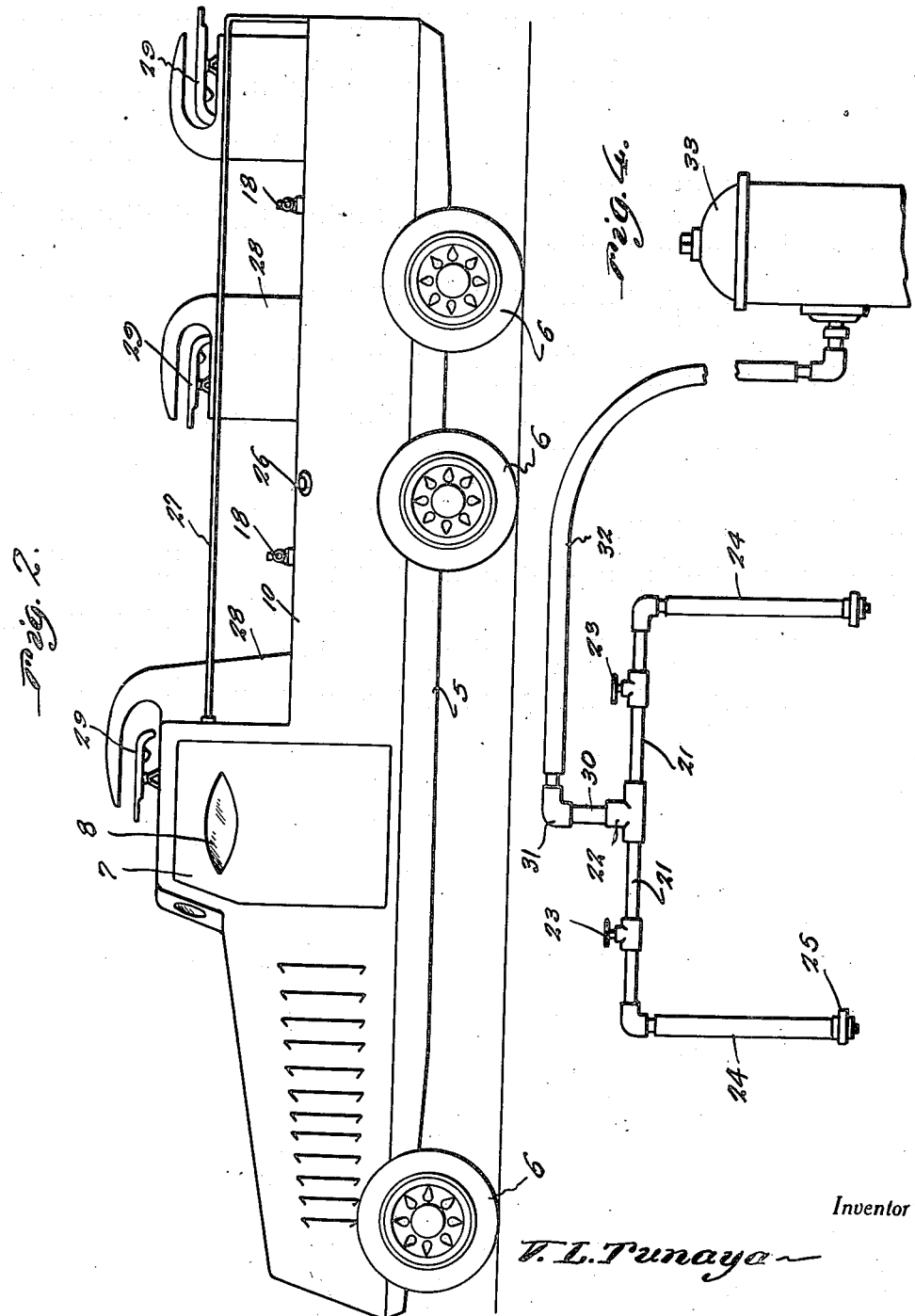
Figure 2 represents a side elevational view of the vehicle.

Referring to the drawings wherein like numerals designate like parts, it can be seen that the car consists of the chassis 5 supported by the wheels 6, in any number desired and the armored doors and windows 7—8 respectively forming the cab of the driver's compartment.

Extending longitudinally on the bed 9 of the car are the elongated parallel water tanks 10—10, sufficiently spaced apart to afford an aisle 11 along which the occupants of the car can move.

Figure 3:
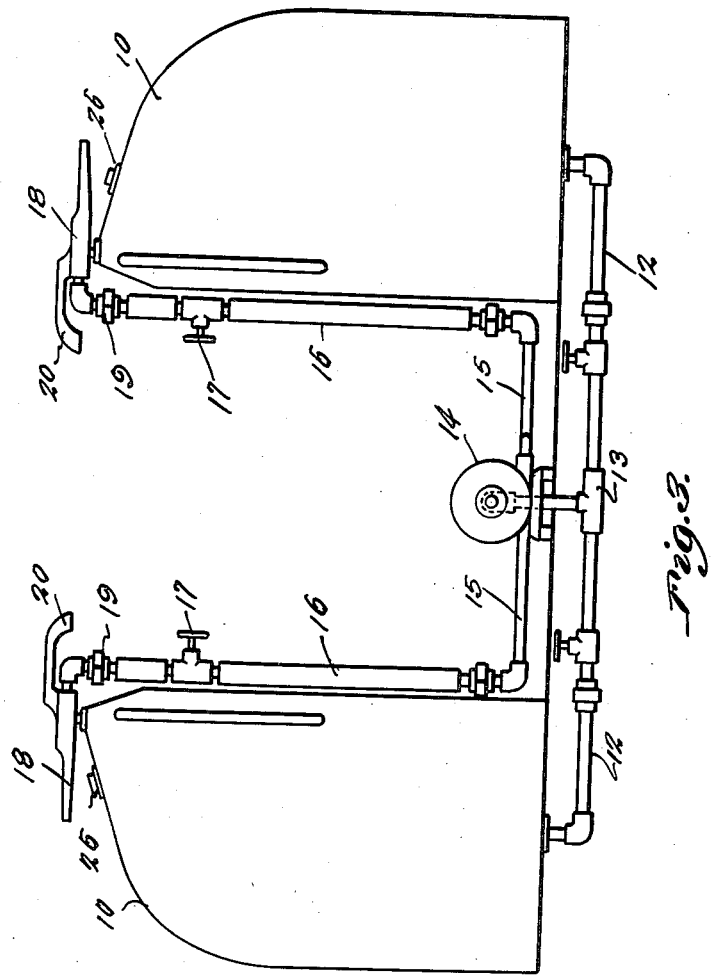
Figure 3 is an end elevational view showing the tanks and the water discharge nozzle.

As is clearly shown in Figure 3, outlet pipes 12—12 extend from the bottoms of the tanks 10—10 and by way of a T 13 are connected to a pump 14, the outlet of which connects to the pipes 15—15 which extend and connect to the conduits 16, each of which has a valve 17 therein. At the upper ends of these conduits 16, any number of which can be provided, are nozzles 18 swivelly connected as at 19 to the corresponding conduits 16 and each nozzle 18 is provided with an actuating handle 20. To permit filling of the tank 10—10 a pair of pipes 21—21 extending from a T 22 and having the valves 23 therein are provided with depending hose sections 24 at the ends thereof, each of which terminates in a connector 25 whereby the same can be connected to the usual filler neck 26 provided on each of the tanks 10.

Guard rails 27 extend longitudinally of the truck over each of the tanks 10 to protect the occupants of the vehicle from falling out. Armored shields 28 are mounted behind the cab and at intervals on the tanks 10 and each has a machine gun 29 mounted therein and swingably mounted so that the same can be directed to various points.

The T 26 has the nipple 30 and elbow 31 connected to the hose 32 which can be applied to the usual fire hydrant 33 to procure a water replenishment for the tank 10.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

A riot car comprising a wheeled platform, said platform being provided with a pair of longitudinally extending liquid tanks defining an elongated aisle between the same, gun turrets mounted on the liquid tanks at spaced intervals, and liquid discharging nozzles mounted on the liquid tanks between the turrets and being connected in communication with the tanks.

VICTORINO L. TUNAYA.